United States Patent
Manabe et al.

(10) Patent No.: US 11,888,163 B2
(45) Date of Patent: Jan. 30, 2024

(54) ALKALINE BATTERY

(71) Applicant: FDK CORPORATION, Tokyo (JP)

(72) Inventors: Takuro Manabe, Tokyo (JP); Yuya Suzuki, Tokyo (JP); Toshiaki Nakano, Tokyo (JP)

(73) Assignee: FDK CORPORATION, Tokyo (JP)

( * ) Notice: Subject to any disclaimer, the term of this patent is extended or adjusted under 35 U.S.C. 154(b) by 132 days.

(21) Appl. No.: 17/372,523

(22) Filed: Jul. 12, 2021

(65) Prior Publication Data

US 2021/0336267 A1    Oct. 28, 2021

Related U.S. Application Data

(63) Continuation of application No. PCT/JP2019/049668, filed on Dec. 18, 2019.

(30) Foreign Application Priority Data

Jan. 15, 2019 (JP) .................. 2019-004363

(51) Int. Cl.
*H01M 50/00* (2021.01)
*H01M 4/62* (2006.01)
(Continued)

(52) U.S. Cl.
CPC ............. *H01M 4/623* (2013.01); *H01M 4/42* (2013.01); *H01M 4/50* (2013.01); *H01M 6/08* (2013.01); *H01M 50/469* (2021.01)

(58) Field of Classification Search
CPC ............... H01M 50/184; H01M 4/244; H01M 50/3425; H01M 50/193; H01M 4/42; Y02E 60/10
See application file for complete search history.

(56) References Cited

U.S. PATENT DOCUMENTS

| | | | |
|---|---|---|---|
| 2006/0172193 A1* | 8/2006 | Iwamoto | H01M 50/184 429/185 |
| 2009/0202910 A1 | 8/2009 | Anglin et al. | |
| 2011/0293999 A1 | 12/2011 | Sumiyama et al. | |

FOREIGN PATENT DOCUMENTS

| | | |
|---|---|---|
| JP | S52-133533 A | 11/1977 |
| JP | S61-208752 A | 9/1986 |

(Continued)

OTHER PUBLICATIONS

FDK Corporation's "Fujitsu How an Alkaline Battery Is Manufactured", retrieved online Oct. 15, 2018 at www.fdk.co.jp/denchi_club/denchi_story/arukari.

(Continued)

*Primary Examiner* — Cynthia H Kelly
*Assistant Examiner* — Monique M Wills
(74) *Attorney, Agent, or Firm* — Isshiki & Partners; Joseph P. Farrar

(57) ABSTRACT

An alkaline battery includes a bottomed tubular battery can made of metal, serving as a positive electrode current collector; a positive electrode mixture sealed in the battery can and formed in a cylindrical shape, the positive electrode mixture containing manganese dioxide as a positive electrode active material and containing a binder including fluorine resin such that a ratio of the binder to the positive electrode active material is 0.2 wt % or more and 0.8 wt % or less; a bottomed tubular separator sealed in the battery can and arranged on an inner peripheral side of the positive electrode mixture; a gel-form negative electrode mixture sealed in the battery can, arranged inside the separator, containing zinc powder as a negative electrode active material; and an electrolyte that includes an alkaline aqueous solution, sealed in the battery can.

1 Claim, 3 Drawing Sheets

(51) Int. Cl.
  *H01M 50/469*  (2021.01)
  *H01M 4/42*   (2006.01)
  *H01M 4/50*   (2010.01)
  *H01M 6/08*   (2006.01)

(56) References Cited

FOREIGN PATENT DOCUMENTS

| JP | H08-162100 A | 6/1996 |
| JP | 2001-297775 A | 10/2001 |
| JP | 2010-218946 A | 9/2010 |
| JP | 2011-060440 A | 3/2011 |
| JP | 2011-511411 A | 4/2011 |
| WO | 2017/110024 A1 | 6/2017 |

OTHER PUBLICATIONS

International Search Report (ISR) for Application No. PCT/JP2019/049668 dated Feb. 25, 2020.
English Translation of the ISR for Application No. PCT/JP2019/049668 dated Feb. 25, 2020.
Written Opinion of the International Search Authority for Application No. PCT/JP2019/049668 dated Feb. 25, 2020.
Partial translation of Written Opinion of the International Search Authority for Application No. PCT/JP2019/049668 dated Feb. 25, 2020.
Japanese Office Action for Application No. 2020-566163 dated Oct. 17, 2023.
Translation of Japanese Office Action for Application No. 2020-566163 dated Oct. 17, 2023.

* cited by examiner

ALKALINE BATTERY

CROSS-REFERENCE TO RELATED APPLICATIONS

This is a continuation application of International Patent Application PCT/JP2019/049668, filed Dec. 18, 2019, which claims the benefit of priority to Japanese Patent Application No. 2019-004363, filed on Jan. 15, 2019, the entire contents of each of which are hereby incorporated herein by reference.

BACKGROUND

Technical Field

The present disclosure relates to an alkaline battery.

Description of the Related Art

An alkaline battery has a structure in which an alkaline power generation element including a positive electrode mixture, a separator, and a gel-form negative electrode mixture is housed in a bottomed cylindrical battery can made of metal, with an opening portion of the battery can is hermetically sealed by using a sealing gasket made of resin. FIG. 1 illustrates an LR6 alkaline battery 1 as an example of an ordinary alkaline battery. FIG. 1 is a vertical cross-sectional view of a cylindrical battery can 2 with the cylinder axis 100 of the cylindrical battery can 2 set to extend in the up-down (i.e., vertical) direction.

The alkaline battery 1 illustrated in FIG. 1 has what is called an inside-out structure, and includes the bottomed cylindrical battery can 2 that is made of metal and which has a bottom portion outer surface on which a positive electrode 9 is formed to serve also as a positive electrode current collector, a positive electrode mixture 3 that is formed in a cylindrical shape, a bottomed cylindrical separator 4 that is arranged inside the positive electrode mixture 3, a gel-form negative electrode mixture 5 that contains a zinc alloy and that fills the inside of the separator 4, a rod-shaped negative electrode current collector 6 that is made of metal and which is inserted into the negative electrode mixture 5, and a dish-shaped negative electrode terminal plate 7 that is made of metal, a sealing gasket 8. In this structure, the positive electrode mixture 3, the separator 4, the negative electrode mixture 5, and an electrolyte including an alkaline aqueous solution form the power generation element of the alkaline battery 1.

The negative electrode current collector 6 is fixed to stand upright by being welded to a lower surface of the negative electrode terminal plate 7, with the bottom portion of the battery can 2 positioned below. The negative electrode terminal plate 7, the negative electrode current collector 6, and the sealing gasket 8 are integrally combined in advance as a sealing unit, and an outer peripheral portion of the sealing gasket 8 is clamped between an opening edge portion of the battery can 2 and a peripheral edge portion of the negative electrode terminal plate 7 by crimping or the like and the battery can 2 is thereby closed.

In the process of assembling the alkaline battery 1, as described at FDK Corporation's "Fujitsu How an Alkaline Battery Is Manufactured", retrieved online on Oct. 15, 2018 at www.fdk.co.jp/denchi_club/denchi_story/arukari, the cylindrical positive electrode mixture 3 is fitted into the battery can 2 and then the separator 4 is inserted inside the positive electrode mixture 3. Next, a liquid injection step of injecting the electrolyte into the battery can 2 and impregnating the separator 4 and the positive electrode mixture 3 with the electrolyte is performed. Subsequently, the inside of the separator 4 is filled with the negative electrode mixture 5 and then a sealing step of closing the battery can 2 with the sealing unit is performed, thereby completing the alkaline battery 1 having a basic configuration illustrated in FIG. 1.

Moreover, in the process of producing the positive electrode mixture 3 for the alkaline battery 1, as illustrated in FIG. 2, first, a positive electrode active material such as electrolytic manganese dioxide (EMD), a conductive material such as graphite, and a binder such as polyacrylic acid are used as powder materials and these powder materials are dry-mixed (s1). Next, an electrolyte including, for example, 40 wt % KOH solution is added to the mixture of the powder materials (s2) and the powder materials and the electrolyte are wet-mixed (s3). Next, the mixture of the powder materials and the electrolyte are processed in steps of rolling, pulverization, granulation, and classification (s4 to s7) to obtain positive electrode mixture particles having a predetermined mean particle size. Then, the positive electrode mixture particles are compressed in a mold and formed into an annular shape (s8). Note that Japanese Patent Application Publication No. S61-208752 describes a technique of improving formability of the positive electrode mixture 3 for the alkaline battery 1 by defining the amount of water to be contained in a mixture of raw materials.

There is a demand for further improvement in the discharge performance of the alkaline battery 1. If the types of raw materials contained in the raw material mixture, the mix ratio of the raw materials, and the like are the same, increasing the density of the positive electrode mixture 3 for the alkaline battery 1 can improve the discharge performance of the alkaline battery 1. Specifically, increasing the density of the positive electrode mixture 3 increases the amount of the positive electrode active material per unit volume and also increases the conductivity in the positive electrode active material in the positive electrode mixture 3, thereby improving discharge performance.

However, the greater the density of the positive electrode mixture 3 is, the lower the liquid absorption property of the positive electrode mixture 3 for the electrolyte is. As a result, when the liquid absorption property of the positive electrode mixture 3 decreases, injection of the electrolyte into the battery can 2 in the manufacturing step of the alkaline battery 1 requires a longer time to fill the inside of the battery can 2 with a predetermined amount of the electrolyte. A longer time required for the step of injecting the electrolyte increases the manufacturing cost of the alkaline battery 1 and therefore providing the alkaline battery 1 at low cost becomes difficult.

Japanese Patent Application Publication No. S61-208752 describes adding an appropriate amount of water to a mixture of a positive electrode active material, a conductive material, and an electrolyte and causing this added water to act as a binder. Polyacrylic acid contained in the aforementioned positive electrode mixture 3 for the alkaline battery 1 as the binder has excellent water absorption. Accordingly, using polyacrylic acid as the binder of the positive electrode mixture 3 can obtain the positive electrode mixture 3 with a molding density of about 3 g/cm$^3$ while still providing good liquid absorption.

However, further increasing the amount of polyacrylic acid added cannot increase the density of the positive electrode mixture for the alkaline battery 1; rather, the density decreases. Specifically, in the positive electrode mixture 3 for the alkaline battery 1 using polyacrylic acid as the binder, it is difficult to obtain both higher density and an improvement in the discharge performance.

Accordingly, the present disclosure provides an alkaline battery with a better discharge performance by improving the binder used in the positive electrode mixture.

SUMMARY

This disclosure provides an alkaline battery including a bottomed tubular battery can made of metal and that also serves as a positive electrode current collector; a positive electrode mixture sealed in the battery can and formed in a cylindrical shape, the positive electrode mixture containing manganese dioxide as a positive electrode active material and containing a binder including fluorine resin such that a ratio of the binder to the positive electrode active material is 0.2 wt % or more and 0.8 wt % or less; a bottomed tubular separator sealed in the battery can and arranged on an inner peripheral side of the positive electrode mixture; a gel-form negative electrode mixture sealed in the battery can, arranged inside the separator, containing zinc powder as a negative electrode active material; and an electrolyte that includes an alkaline aqueous solution, sealed inside the battery can.

DETAILED DESCRIPTION

Figure 1:
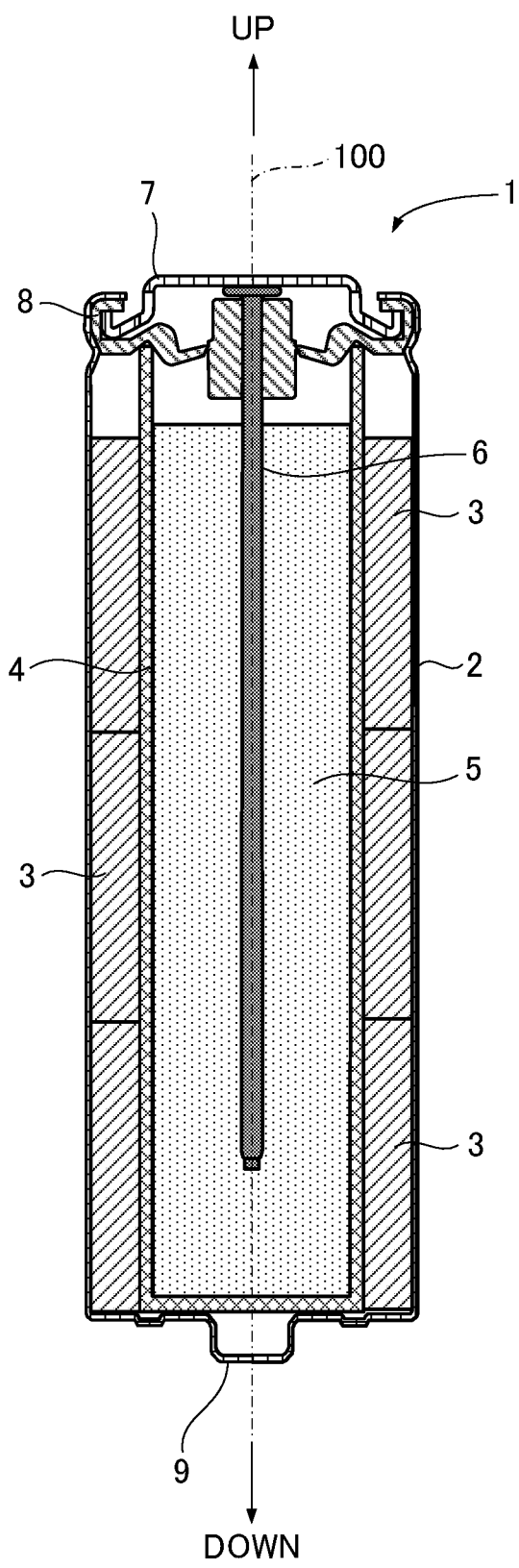
FIG. 1 is a view illustrating a structure of an alkaline battery.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, alkaline batteries according to embodiments of the present disclosure are described. As used herein, the singular forms "a", "an", and "the" are intended to include the plural forms as well, unless the context clearly indicates otherwise.

An embodiment of the present disclosure is described below with reference to the attached drawings. Note that, in the drawings used in the following description, the same or similar parts are denoted by the same reference signs and repetitive description thereof is omitted in some cases.

Embodiments

Figure 3:
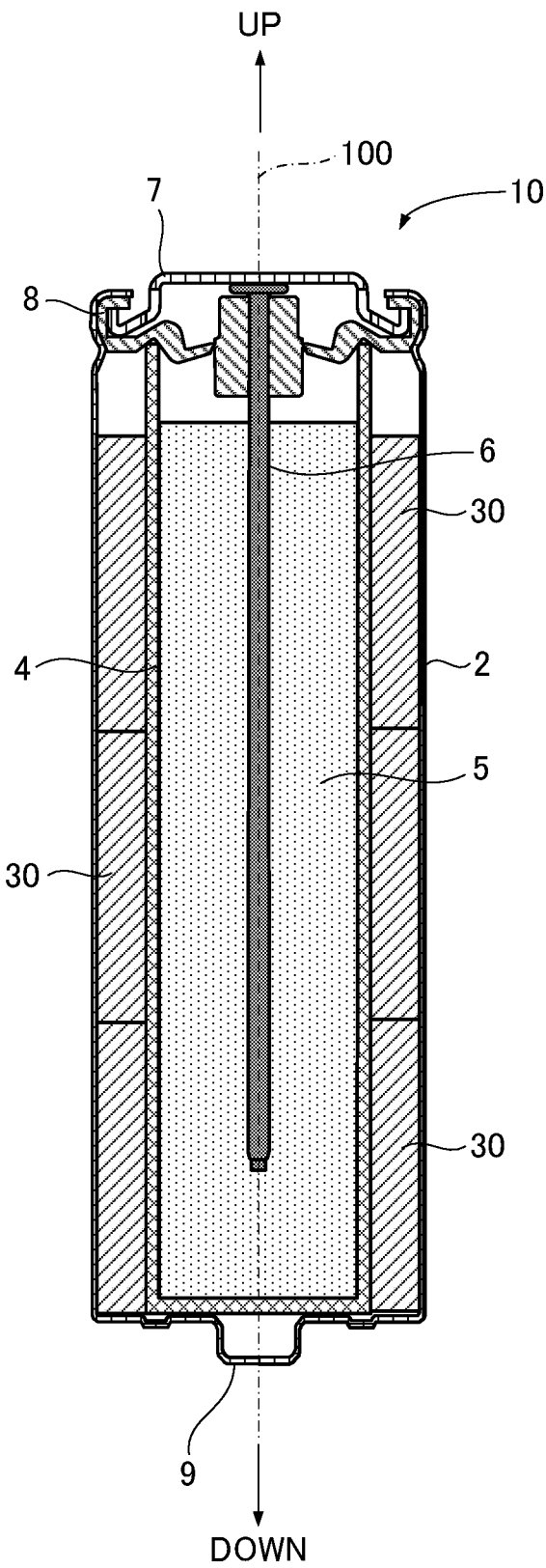
FIG. 3 is a view illustrating a structure of the alkaline battery according to the present disclosure.

FIG. 3 illustrates an alkaline battery 10 according to an embodiment of the present disclosure. Fluorine resin is contained as a binder in a positive electrode mixture 30 of the alkaline battery 10. The configuration of the alkaline battery 10 is the same as or similar to that of the aforementioned alkaline battery 1 except for the points described below and detailed description thereof is thus omitted.

As widely known, fluorine resin is sometimes used as a binder of a positive electrode mixture for batteries such as a lithium primary battery including non-aqueous electrolyte that uses organic solvent and negative electrode lithium that is a negative electrode using lithium metal or a lithium alloy. The reason for this is that the negative electrode lithium has high reducibility and violently reacts with water, and therefore a water-repellent binder and excellent corrosion resistance such as fluorine resin thus needs to be used for the positive electrode mixture of the battery including the negative electrode lithium and the non-aqueous electrolyte.

The alkaline battery 10 according to the embodiment uses fluorine resin as the binder of the positive electrode mixture 30. Generally, there is a concern that, because fluorine resin is water-repellent, the liquid absorption of the electrolyte using water as a solvent may deteriorate. Hence, adding fluorine resin into the positive electrode mixture 30 of the alkaline battery 10 as the binder has been inconceivable to those skilled in the art.

Evaluation of Characteristics

Samples

In order to evaluate the characteristics of the alkaline battery 10 according to the embodiment of the present disclosure, three types of positive electrode mixtures A, B, and C varying in manufacturing conditions and LR6 alkaline batteries 1 and 10 including these various types of positive electrode mixtures A, B, and C were produced as samples. Specifically, three types of positive electrode mixtures A, B, and C varying in the type of the binder, the amount of the added binder, and the amount of water were produced.

Figure 2:
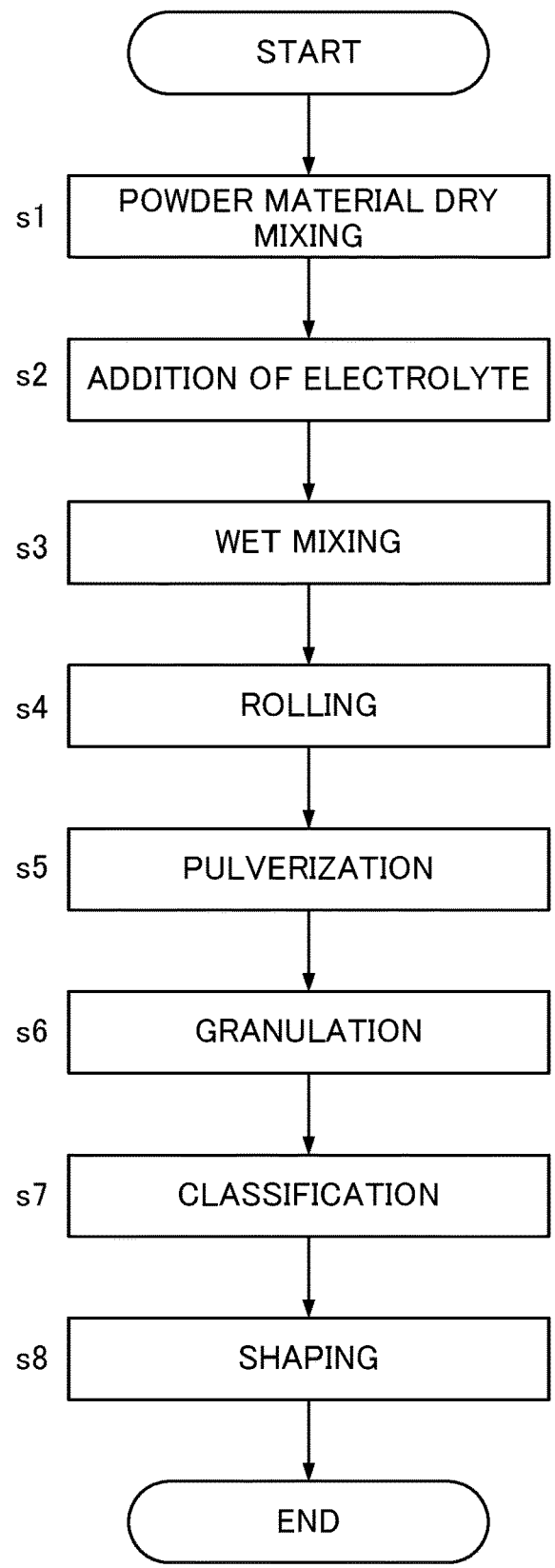
FIG. 2 is a view illustrating steps in a process of manufacturing a positive electrode mixture for the alkaline battery illustrated in FIG. 1.

The process of producing the positive electrode mixtures A, B, and C was the same as or similar to the production process of the positive electrode mixture 3 illustrated in FIG. 2. However, in the step of dry-mixing the powder materials (s1), the type and the amount of the binder added to electrolytic manganese dioxide (EMD) were varied depending on the samples. In the electrolyte adding step (s2), the amount of the electrolyte including KOH solution was varied depending on the sample. In other steps (s3 to s6), the manufacturing conditions of the positive electrode mixtures A, B, and C were the same for all samples. Note that, in the step of dry-mixing the powder materials (s1), a predetermined amount (for example, 6.5 wt %) of graphite which is a conductive material was added to EMD.

The fabrication conditions, the amount of liquid absorption, and the mold density of the aforementioned positive electrode mixtures A, B, and C are described in the following Table 1.

TABLE 1

| Positive electrode mixture | Binder | | | Amount of liquid absorption (%) | Density (g/cm³) |
| | Type | Amount added (wt % with respect to EMD) | Amount of water (wt % with respect to EMD) | | |
| --- | --- | --- | --- | --- | --- |
| A | Fluorine resin | 0.4 | 3.31 | 100.0 | 3.24 |
| B | Fluorine resin | 0.8 | 3.30 | 100.0 | 3.34 |
| C | Polyacrylic acid | 0.2 | 3.30 | 100.0 | 3.24 |

In Table 1, the positive electrode mixture A and the positive electrode mixture B correspond to the positive electrode mixture 30 incorporated in the alkaline battery 10 according to the embodiment of the present disclosure. The positive electrode mixture C corresponds to the positive electrode mixture 3 incorporated in the alkaline battery 1 according to a comparative example.

The positive electrode mixtures A and B contain fluorine resin as the binder. In this case, perfluoro ethylene propylene copolymer (FEP) was the fluorine resin.

The positive electrode mixture C contains polyacrylic acid as the binder and is substantially the same as the positive electrode mixtures used in commercially-available alkaline batteries.

As described in Table 1, in the positive electrode mixtures A and B containing fluorine resin as the binder, the amounts of the added binder with respect to the EMD are two times and four times that of the positive electrode mixture C containing polyacrylic acid as the binder, respectively. However, in each of the positive electrode mixtures A and B, no decrease in the liquid absorption property, which was a concern when fluorine resin was used as the binder, was observed. Thus, it was confirmed that the liquid absorption property as high as that in the positive electrode mixture C was maintained. It was also confirmed that a density similar to that of the positive electrode mixture C containing polyacrylic acid as the binder was maintained.

Discharge Performance Evaluation

Next, the LR6 alkaline batteries 1 and 10 were assembled using each of the positive electrode mixtures A, B, and C described in Table 1, as samples 1, 2, and 3. Note that the assembly procedure followed the procedure described at FDK Corporation's, "Fujitsu How an Alkaline Battery Is Manufactured", retrieved online on Oct. 15, 2018 at www.fdk.co.jp/denchi_club/denchi_story/arukari. Then, various types (in this case, five types) of discharge performance evaluations using different test methods were performed on each of the samples 1, 2, and 3. Note that three individual pieces of each of the samples 1, 2, and 3 were fabricated for each of different types of tests and each type of discharge performance was evaluated by taking an average value of the three individual pieces.

Table 2 below describes results of discharge performance evaluation for the samples 1, 2, and 3.

TABLE 2

| | | Sample 1 | Sample 2 | Sample 3 |
|---|---|---|---|---|
| Positive electrode mixture | Type | Positive electrode mixture A | Positive electrode mixture B | Positive electrode mixture C |
| | Binder | Fluorine resin | Fluorine resin | Polyacrylic acid |
| | Amount added (wt % with respect to EMD) | 0.4 | 0.8 | 0.2 |
| Discharge test | Short-circuit current FC (A) | 17.6 | 19.1 | 15.9 |
| | Condition 1 Test result (hours) | 17.6 | 19.1 | 15.9 |
| | Condition 1 Relative value (%) | 102 | 104 | 100 |
| | Condition 2 Test result (minutes) | 74.5 | 85.6 | 68.3 |
| | Condition 2 Relative value (%) | 109 | 125 | 100 |
| | Condition 3 Test result (hours) | 52.5 | 50.8 | 49.3 |
| | Condition 3 Relative value (%) | 106 | 103 | 100 |
| | Condition 4 Test result (hours) | 25.3 | 23.3 | 22.6 |
| | Condition 4 Relative value (%) | 112 | 103 | 100 |
| | Condition 5 Test result (minutes) | 432.2 | 412.2 | 389.8 |
| | Condition 5 Relative value (%) | 111 | 106 | 100 |

In Table 2, the samples 1 and 2, corresponding to the alkaline battery 10 according to the embodiment, were fabricated by using the positive electrode mixtures A and B described in Table 1, respectively. The sample 3 is the alkaline battery 1 fabricated by using the positive electrode mixture C described in Table 1. Table 2 describes the short-circuit current (FC) and the evaluation results of the discharge tests performed in five types of methods of conditions 1 to 5, for each of the samples 1, 2, and 3. The evaluation results for each of the conditions 1 to 5 also show a relative value calculated with the test result for the sample 3 taken as 100. Details of the tests for FC and the conditions 1 to 5 and the results of these tests are described below.

Short-Circuit Current (FC)

In Table 2, FC indicates a current value (A) when the positive electrode and the negative electrode were short-circuited in each of the samples 1, 2, and 3. A higher FC value means that the battery has a lower internal resistance and it is easy for the battery to discharge a larger current. As described in Table 2, it was found that the samples 1 and 2 have higher FC values than the sample 3. Furthermore, FC in the sample 2 including the positive electrode mixture B in which the amount of added fluorine resin was 0.8% with respect to the manganese dioxide was greater than FC of the sample 1 including the positive electrode mixture A in which the amount of added fluorine resin was 0.4% with respect to the manganese dioxide.

Condition 1

Each of the samples 1, 2, and 3 was supplied with a current of 250 mA continuously for one hour per day. The time taken to reach the end point voltage (E.P.V) in the aforementioned condition was obtained. Note that the end point voltage was set to 0.9 V. The unit in Table 2 is hours. As described in Table 2, it was found that the samples 1 and 2 take a longer time to reach the end point voltage than the sample 3 and thus have better discharge performance. Moreover, as noted previously, the sample 2 including the positive electrode mixture B in which the amount of added fluorine resin was 0.8% with respect to the manganese dioxide has a better discharge performance than the sample 1 including the positive electrode mixture A in which the amount of added fluorine resin was 0.4% with respect to the manganese dioxide.

Condition 2

Each of the samples 1, 2, and 3 was made to repeatedly perform a cycle of supplying a current of 750 mA continuously for two minutes per hour, eight times per day. The time taken to reach the end point voltage in the aforementioned condition was obtained. Note that the end point voltage was set to 0.9 V. The unit in Table 2 is minutes. It was found that the samples 1 and 2 take a longer time to reach the end point voltage than the sample 3 and thus have high discharge performance. Moreover, the sample 2 has a better discharge performance than the sample 1 and a difference between the sample 2 and the sample 3 was notable.

Condition 3

Each of the samples 1, 2, and 3 was made to repeatedly perform a cycle of supplying a current of 50 mA continuously for one hour and then suspending the current supply for seven hours, three times per day. The time taken to reach the end point voltage in the aforementioned condition was obtained. Note that the end point voltage was set to 1.0 V. The unit in Table 2 is hours.

It was found that the samples 1 and 2 in which fluorine resin was used as the binder of the positive electrode mixture 30 take a longer time to reach the end point voltage than the sample 3 and thus have better discharge performance. Moreover, the sample 2 has a worse discharge performance than the sample 1 but a better discharge performance than the sample 3.

Condition 4

Each of the samples 1, 2, and 3 was made to supply a current of 100 mA continuously for one hour per day. The time taken to reach the end point voltage in the aforementioned condition was obtained. Note that the end point voltage was set to 0.9 V. The unit in Table 2 is hours. It was found that the samples 1 and 2 take a longer time to reach the end point voltage than the sample 3 and thus have better discharge performance. Moreover, the sample 2 has a worse discharge performance than the sample 1 but a better discharge performance than the sample 3.

Condition 5

A cycle of applying a load of 3.9Ω to each of the samples 1, 2, and 3 continuously for four minutes was repeatedly performed eight times per day. The time taken to reach the end point voltage in the aforementioned condition was obtained. Note that the end point voltage was set to 0.9 V. The unit in Table 2 is minutes. It was found that the samples 1 and 2 take a longer time to reach the end point voltage than the sample 3 and thus have better discharge performance. Moreover, the sample 2 has a worse discharge performance than the sample 1 but a better discharge performance than the sample 3.

Note that, among the conditions 1 to 5, the condition 1 is the highest load discharge, followed in order by the condition 2, the condition 3, the condition 4, and the condition 5. The conditions 4 and 5 are categorized as low and intermediate load discharge. Specifically, from the aforementioned results, it was found that the alkaline battery 10 of the embodiment has superior discharge performance not only at high load discharge but also at low and intermediate load discharge.

It was found that using the positive electrode mixture 30 containing fluorine resin as the binder as described above can improve the discharge performance of the alkaline battery 10. The reason for this is assumed to be a synergy of the following effects: fluorine resin exhibited its function (binder effect) of binding the positive electrode active material and the conductive material in the positive electrode mixture 30; the water repelling-property of fluorine resin prevented the fluorine resin from absorbing water in the electrode mixture 30 and water exhibited its inherent binder effect; and moreover, the positive electrode mixture 30 contained an appropriate amount of fluorine resin to a degree that did not hinder the liquid absorbent property of the positive electrode mixture 30.

Other Embodiments

The Amount of Added Binder

The samples 1 and 2 described in Table 2 correspond to the alkaline battery 10 according to the embodiment and the binder including fluorine-based resin was added to the positive electrode mixture 30. The amounts of the added binder in the positive electrode mixtures 30 of the samples 1 and 2 are two times and four times, respectively, the amount of the added binder including polyacrylic acid in the positive electrode mixture 3 of the sample 3 corresponding to the alkaline battery 1 of the comparative example. Although the amount of the binder that does not contribute to power generation is large in the positive electrode mixture 30 of the alkaline battery 10 according to the embodiment, the positive electrode mixture 30 had liquid absorption and density equivalent to those of the positive electrode mixture 3 of the alkaline battery 1 in the comparative example and also had excellent discharge performance. Accordingly, if the alkaline battery 10 is fabricated by using a positive electrode mixture 30 having a higher liquid absorption and a higher density than the positive electrode mixture 3 of the alkaline battery 1 in the comparative example, the discharge performance of the fabricated alkaline battery 10 is expected to be better than those of the samples 1 and 2 described in Table 2.

In view of the above-described results, we produced various types of positive electrode mixtures 3 and 30 that contained fluorine-based resin as the binder and that varied in the amount of added fluorine-based resin and the amount of water, and examined the amounts of liquid absorption and the densities of these positive electrode mixtures 3 and 30.

Table 3 below describes the amounts of liquid absorption and the densities of various types of positive electrode mixtures D to N varying in fabrication conditions.

TABLE 3

| Positive electrode mixture | Binder | | Amount of liquid absorption (%) | Density (g/cm$^3$) |
| | Type | Amount added (wt % with respect to EMD) | Amount of water (wt % with respect to EMD) | | |
| --- | --- | --- | --- | --- | --- |
| D (C) | Polyacrylic acid | 0.2 | 3.30 | 100.0 | 3.24 |
| E | Fluorine resin | 0.2 | 3.30 | 103.9 | 3.24 |
| F (A) | | 0.4 | 3.31 | 100.0 | 3.24 |
| G | | 0.6 | 3.30 | 100.0 | 3.30 |
| H (B) | | 0.8 | 3.30 | 100.0 | 3.34 |
| I | | 1.0 | 3.30 | 96.1 | 3.29 |
| J | | 0.8 | 2.00 | 102.0 | 3.22 |
| K | | 0.8 | 2.39 | 103.9 | 3.31 |
| L | | 0.8 | 3.17 | 100.0 | 3.32 |
| M | | 0.8 | 3.28 | 100.0 | 3.33 |
| N | | 0.8 | 3.35 | 98.0 | 3.37 |

In Table 3, the positive electrode mixture D is the positive electrode mixture C described in Table 1 and corresponds to the positive electrode mixture 3 in the comparative example. The positive electrode mixtures F and H correspond to the positive electrode mixtures A and B in Table 1, respectively. As described in Table 3, the positive electrode mixtures E to I containing fluorine resin as the binder are mixtures in which the amount of the added binder was varied within a range of 0.2 wt % to 1.0 wt % with the amount of water maintained at an amount equivalent to the positive electrode mixture C used in the alkaline battery 1 of the comparative example. The positive electrode mixture E in which the amount of the added binder is 0.2 wt % had the same density as the positive electrode mixture D and had a slightly larger amount of liquid absorption. The positive electrode mixtures F to H in which the amount of the added binder is 0.4 wt % to 0.8 wt % had an amount of liquid absorption equivalent to the positive electrode mixture D and each had a density higher than or equal to that of the positive electrode mixture D. However, the positive electrode mixture I in which the amount of the added binder including fluorine resin was 1.0 wt % had an amount of liquid absorption 96.1% of that of the sample D.

Thus, from Table 3 it is clear that the positive electrode mixture 30 containing fluorine resin as the binder maintains the same level of liquid absorption as the positive electrode mixture 3 containing polyacrylic acid as the binder, and has the same or higher density than the positive electrode mixture 3, provided that the positive electrode mixture 30 contains an appropriate amount of binder to a degree that does not hinder the liquid absorption, specifically, in such a way that the ratio of the binder to the positive electrode active material is 0.2 wt % or more and 0.8 wt % or less. Thus, the alkaline battery 10 including such a positive electrode mixture 30 is expected to have excellent discharge performance.

Next, we examined how much the amount of water contained in the positive electrode mixture 30 to which the binder including fluorine resin was added can be increased or decreased with respect to the amount of water (about 3.30 wt %) contained in the positive electrode mixture 3 (positive electrode mixture D) for the alkaline battery 1 of the comparative example. In Table 3, the amounts of the added binder in the positive electrode mixtures J to N are 0.8 wt % and the amounts of water therein are different from one another within a range of 2.00 wt % to 3.35 wt %. Among the positive electrode mixtures J to N, the positive electrode mixture J with an amount of water of 2.00 wt % has an amount of liquid absorption of 102.0% which is higher than the amount of liquid absorption of the positive electrode mixture D, and has a density of 3.22 g/m$^3$ which is slightly lower than the density of the positive electrode mixture D. Moreover, the positive electrode mixture K with an amount of water of 2.39 wt % has an amount of liquid absorption of 103.9% and a density of 3.31 g/m$^3$ which are higher than the amount of liquid absorption and the density of the positive electrode mixture D.

Thus, a density higher than that of the positive electrode mixture D can be obtained if the amount of water is 2.39 wt % or higher. Meanwhile, the positive electrode mixture N with an amount of water of 3.35% had an amount of liquid absorption of 98.0% which is slightly lower than the amount of liquid absorption of the positive electrode mixture D. From the above, it was found that the amount of water can be increased or decreased within a range of 2.39 wt % or more and less than 3.35 wt %. Moreover, if an increase or a decrease of the amount of water is allowed, there is no need to strictly manage at least the manufacturing step of the positive electrode mixture 30 in the production step of the alkaline battery 10 and the manufacturing cost of the alkaline battery 10 can be reduced.

Regarding Fluorine-Based Resin

The fluorine resin used as the binder in the positive electrode mixture 30 of the alkaline battery 10 according to the embodiment is not limited to FEP. Thus, other fluorine resins, such as polytetrafluoroethylene (PTFE) and polyvinylidene difluoride (PVDF), are also water-repellent and exhibit effects similar to those of FEP.

The present disclosure provides an alkaline battery with improved discharge performance.

The above-described embodiment is intended to facilitate an understanding of the present disclosure and is not in any way to be construed as limiting the present disclosure. The present disclosure may be modified and improved without departing from the scope of the disclosure, and equivalents thereof are also encompassed by the disclosure.

What is claimed is:

1. An alkaline battery comprising:
a bottomed tubular battery can made of metal as a positive electrode current collector;
a positive electrode mixture sealed in the battery can and formed in a cylindrical shape, the positive electrode mixture containing manganese dioxide as a positive electrode active material and containing a binder including fluorine resin, such that the binder is present in an amount of 0.2 wt % or more and 0.8 wt % or less of the positive electrode mixture;
a bottomed tubular separator sealed in the battery can and arranged on an inner peripheral side of the positive electrode mixture;
a gel-form negative electrode mixture sealed in the battery can, arranged inside the separator, containing zinc powder as a negative electrode active material; and
an electrolyte that includes an alkaline aqueous solution, sealed inside the battery can,
wherein the positive electrode mixture further contains 2.39 wt % or more and less than 3.35 wt % water with respect to the positive electrode active material.

* * * * *